US011421548B2

(12) United States Patent
Belleville et al.

(10) Patent No.: US 11,421,548 B2
(45) Date of Patent: Aug. 23, 2022

(54) AIRCRAFT ENGINE ASSEMBLY WITH BOUNDARY LAYER INGESTION INCLUDING AN ELECTRIC MOTOR AND A COOLING SYSTEM PARTIALLY ARRANGED IN THE EXHAUST CONE

(71) Applicant: Airbus Operations S.A.S., Toulouse (FR)

(72) Inventors: Mathieu Belleville, Toulouse (FR); Jérome Colmagro, Toulouse (FR)

(73) Assignee: Airbus Operations S.A.S.

( * ) Notice: Subject to any disclaimer, the term of this patent is extended or adjusted under 35 U.S.C. 154(b) by 149 days.

(21) Appl. No.: 16/695,631

(22) Filed: Nov. 26, 2019

(65) Prior Publication Data
US 2020/0182087 A1 Jun. 11, 2020

(30) Foreign Application Priority Data
Dec. 5, 2018 (FR) ...................................... 18 72397

(51) Int. Cl.
*F01D 25/12* (2006.01)
*B64D 27/16* (2006.01)
*B64D 27/24* (2006.01)
*B64D 33/08* (2006.01)

(52) U.S. Cl.
CPC .............. *F01D 25/12* (2013.01); *B64D 27/16* (2013.01); *B64D 27/24* (2013.01); *B64D 33/08* (2013.01); *F05D 2220/323* (2013.01); *F05D 2260/2214* (2013.01)

(58) Field of Classification Search
CPC .. F01D 25/12; F01P 11/10; F02C 7/12; F02C 7/14; F04D 29/5806; F28D 1/02; F28D 1/0233; F28D 1/024; F28D 1/0246; F28D 1/04; F28D 1/0435; F28D 1/047; F28D 1/0472; B64C 21/02; B64C 21/06; B64D 27/16; B64D 27/24; B64D 33/00; B64D 33/08; B64D 33/10
USPC ......................................................... 415/177
See application file for complete search history.

(56) References Cited

U.S. PATENT DOCUMENTS

| | | | |
|---|---|---|---|
| 9,677,819 B2 * | 6/2017 | Lee ......................... F28F 9/027 |
| 10,252,810 B2 * | 4/2019 | Niergarth .................. F02C 3/04 |
| 10,800,539 B2 * | 10/2020 | Niergarth ............... B64D 27/02 |
| 11,098,678 B2 * | 8/2021 | Suciu ........................ F02K 5/00 |
| 11,105,340 B2 * | 8/2021 | Cheung ............... F04D 29/5806 |
| 2018/0051716 A1 | 2/2018 | Cheung et al. |
| 2018/0057181 A1 * | 3/2018 | Yao ......................... B64C 21/06 |

(Continued)

FOREIGN PATENT DOCUMENTS

| | | |
|---|---|---|
| CA | 2962485 A1 | 4/2016 |
| CN | 108263620 A | 7/2018 |

*Primary Examiner* — Woody A Lee, Jr.
*Assistant Examiner* — Justin A Pruitt
(74) *Attorney, Agent, or Firm* — Lerner, David, Littenberg, Krumholz & Mentlik, LLP

(57) ABSTRACT

An engine assembly with an electric motor that includes a cooling system of which a heat sink portion is arranged in an exhaust cone downstream of the fan driven by the electric motor, that is designed to effect thermal exchanges with a wall of the exhaust cone. Such an electric rear fan arrangement with boundary layer ingestion enables a cold air flow coming from the fan when the engine assembly is in operation to be used to cool the different components of the engine assembly.

9 Claims, 2 Drawing Sheets

(56) References Cited

U.S. PATENT DOCUMENTS

2019/0145318 A1\* 5/2019 Foutch .................... F28D 7/103
                                                                                                  415/177

\* cited by examiner

AIRCRAFT ENGINE ASSEMBLY WITH BOUNDARY LAYER INGESTION INCLUDING AN ELECTRIC MOTOR AND A COOLING SYSTEM PARTIALLY ARRANGED IN THE EXHAUST CONE

FIELD OF THE INVENTION

The invention relates to an aircraft engine assembly.

More specifically, the invention relates to an architecture of such an engine assembly and the installation thereof in an aircraft.

BACKGROUND OF THE INVENTION

An aircraft typically has at least one fuselage, one airfoil usually comprising two wings extending on both sides of the fuselage, and a tail unit.

Such an aircraft also has at least one engine assembly, and one of the most commonly used engine assemblies is a turbo-jet engine.

An engine assembly can be installed in the aircraft using a range of different arrangements. By way of example of common arrangements, an engine assembly can be suspended beneath a wing, for example by a support pylon, or fastened to the rear of the fuselage, for example by a pylon, or built into the tail unit.

Such an engine assembly typically includes an engine, traditionally a heat engine, of which an output shaft drives a fan in rotation.

Such an engine assembly also has a nacelle that forms an aerodynamic fairing, usually containing the fan.

In the assembly according to the present document, the notions of upstream and downstream refer to the direction of flow of the propulsion gases, notably air, in the engine assembly and notably in the conduit formed by the nacelle thereof.

Finally, there is usually a cooling system designed to keep the temperature of the different components, at least on the surface, within the desired ranges.

Indeed, and by way of example in the case of a heat engine in operation, the exhaust gases can reach a temperature of around 600° C., and the output shaft of the engine can reach a surface temperature of around 400° C. Such temperatures affect the various different components, in particular the expansion of roller bearings or the fluidity of oil or any other coolant fluid.

It is therefore usually desirable to keep the surface temperature of the various different components around 120° C., for example approximately between 100° C. and 150° C.

For a heat engine, cooling is often carried out using a relatively cold external air flow to cool the various different internal components of the engine. A portion of this external air is used for the combustion reaction inside the heat engine and another portion is used for cooling.

The external air flow is then taken upstream of the nacelle, in particular at the fuselage head, to ensure that said air flow is cold enough to offset the hot air flow coming out of the engine.

As a result, the cooling system is relatively cumbersome and requires numerous elements, for example pumps, to ensure the desired thermal exchanges.

Furthermore, while the aircraft is moving through the air, the outer surfaces thereof affect the flow of the air. In particular, while an object is moving through the air, a boundary layer is created on the surface of that object. This boundary layer is a zone of air in which the air flow speed is slower than the speed of the flow outside the boundary layer, on account of the viscosity of the air and the contact thereof with the surface of the object.

Consequently, an aircraft engine assembly is usually designed not to aspirate the boundary layer created on the surface of the aircraft.

To ensure this, the engine assembly is usually arranged with an air inlet of the engine assembly positioned in a free air flow, i.e. a flow that is disturbed as little as possible by the surface of the aircraft, for example outside the boundary layer.

However, placing an air intake in the external air flow has a significant impact on drag and consequently on the performance of the aircraft, in particular in terms of fuel consumption.

Improving the efficiency of aircraft propulsion is a major challenge nowadays, notably in order to reduce the specific consumption thereof (i.e. the fuel consumption in relation to the mass of the aircraft).

Thus, boundary-layer ingestion (BLI) by an engine assembly can be used in a range of different arrangements.

Boundary layer ingestion by the engine assembly offers certain advantages compared to engine assemblies with an air intake in a free air flow.

Indeed, less energy is used to exploit the disturbed air and drag is minimized by not disturbing the free air flow.

Furthermore, recent developments aim to replace heat engines with electric motors.

As a result, there would no longer be any hot exhaust gas flow outputted from the engine (for example a 600° C. flow, as explained above).

BRIEF SUMMARY OF THE INVENTION

Aspects of the invention may propose an architecture that at least partially mitigates the aforementioned drawbacks, and also brings other advantages.

For this purpose, an aircraft engine assembly comprising an electric motor, a fan that is driven in rotation by the electric motor and that is downstream of the electric motor, an exhaust cone downstream of the fan, and a nacelle surrounding at least the fan and a portion of the exhaust cone that forms, with the nacelle, an air flow conduit of the engine assembly is proposed, in which the engine assembly also includes a cooling system that has at least one channel, the channel having a heat sink portion arranged in the exhaust cone downstream of the fan that is designed to effect thermal exchanges with a wall of the exhaust cone.

An electric rear fan arrangement with boundary layer ingestion (BLI) enabling a cold air flow coming from the fan when the engine assembly is in operation to be used to cool the different components of the engine assembly, is thus proposed.

Since an electric motor does not generate a hot air flow (i.e. for example air at approximately 600° C.), the available space between the nacelle and the exhaust cone downstream of the fan can be used to encourage thermal exchanges with the wall of the exhaust cone.

Thus, during operation, the aerodynamically shaped wall of the exhaust cone is cooled by the fan, which blows the air thereupon.

Such an aerodynamic surface could not previously be used on account of the hot gas exhaust generated by the heat engine.

Moreover, the space allocated to the exhaust cone can be optimized.

The negative impact on drag can also be limited, in part by obviating the need for an air intake in the external free air flow.

The channel then preferably forms a closed circuit.

According to an example embodiment, the heat sink portion of the channel is arranged against the wall of the exhaust cone.

According to an example embodiment, the channel is designed to convey a coolant fluid from the exhaust cone to the electric motor, then back to the exhaust cone.

According to an example embodiment, the heat sink portion of the channel is arranged in loops inside the exhaust cone.

In this case, loop shall mean any meanders or spirals intended to maximize an exchange surface between the heat sink portion of the channel and the wall of the exhaust cone.

Thus, for example, the heat sink portion of the channel can have meanders or spirals to maximize the exchange surfaces with the wall of the exhaust cone.

For example, the heat sink portion of the channel is arranged in a helix inside the exhaust cone.

According to an interesting example, the heat sink portion of the channel is in contact with the wall of the exhaust cone in order to maximize thermal exchanges.

According to an example embodiment, the heat sink portion of the channel has a coolant fluid inlet loop that is positioned towards the fan and a coolant fluid outlet loop that is positioned towards an extremity of the exhaust cone opposite the fan.

In an interesting example embodiment, the channel has a heat recovery portion that is designed to cool at least a portion of the engine assembly.

According to an example embodiment, the heat recovery portion is designed to convey the coolant fluid from the coolant fluid outlet loop of the heat sink portion to the coolant fluid inlet loop of the heat sink portion.

According to an example embodiment, the heat recovery portion is designed to cool at least the electric motor and/or the drive shaft of the fan.

According to another aspect, a rear aircraft portion including a rear fuselage portion and at least one aircraft engine assembly with at least some of the features set out above, in which at least a portion of the electric motor is positioned in the rear portion of the fuselage, is also proposed.

Such an arrangement helps to further reduce the negative effects of drag.

According to yet another aspect, an aircraft with a rear portion as described above is also proposed.

BRIEF DESCRIPTION OF THE DRAWINGS

The invention, according to an example embodiment, and the advantages thereof are further explained in the detailed description below, which is provided by way of non-limiting example with reference to the attached drawings, in which.

Identical elements shown in the aforementioned figures are identified by identical reference numbers.

DETAILED DESCRIPTION

Figure 1:
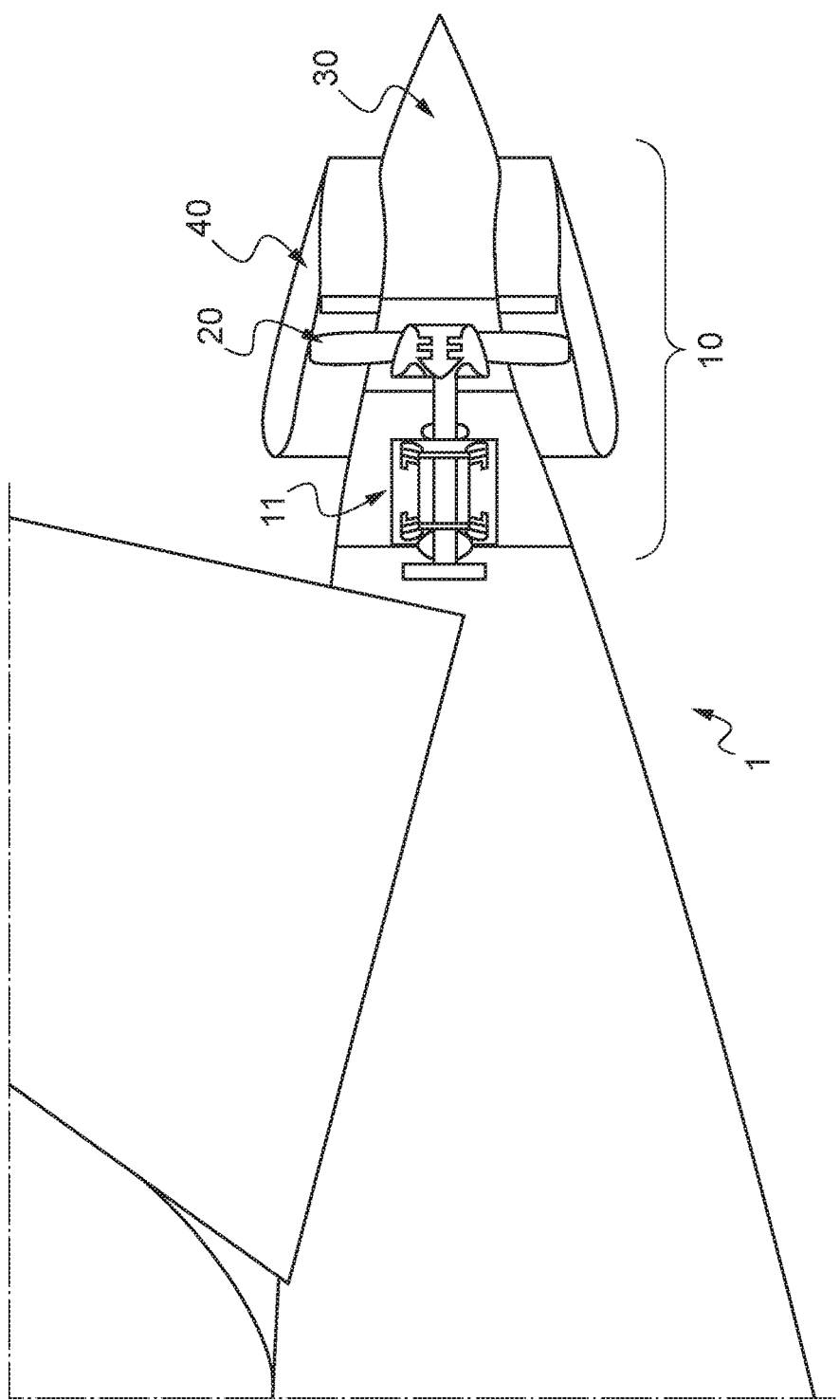
FIG. 1 is a schematic view of an aircraft engine assembly and installation thereof in an aircraft according to one embodiment of the invention.
Figure 2:
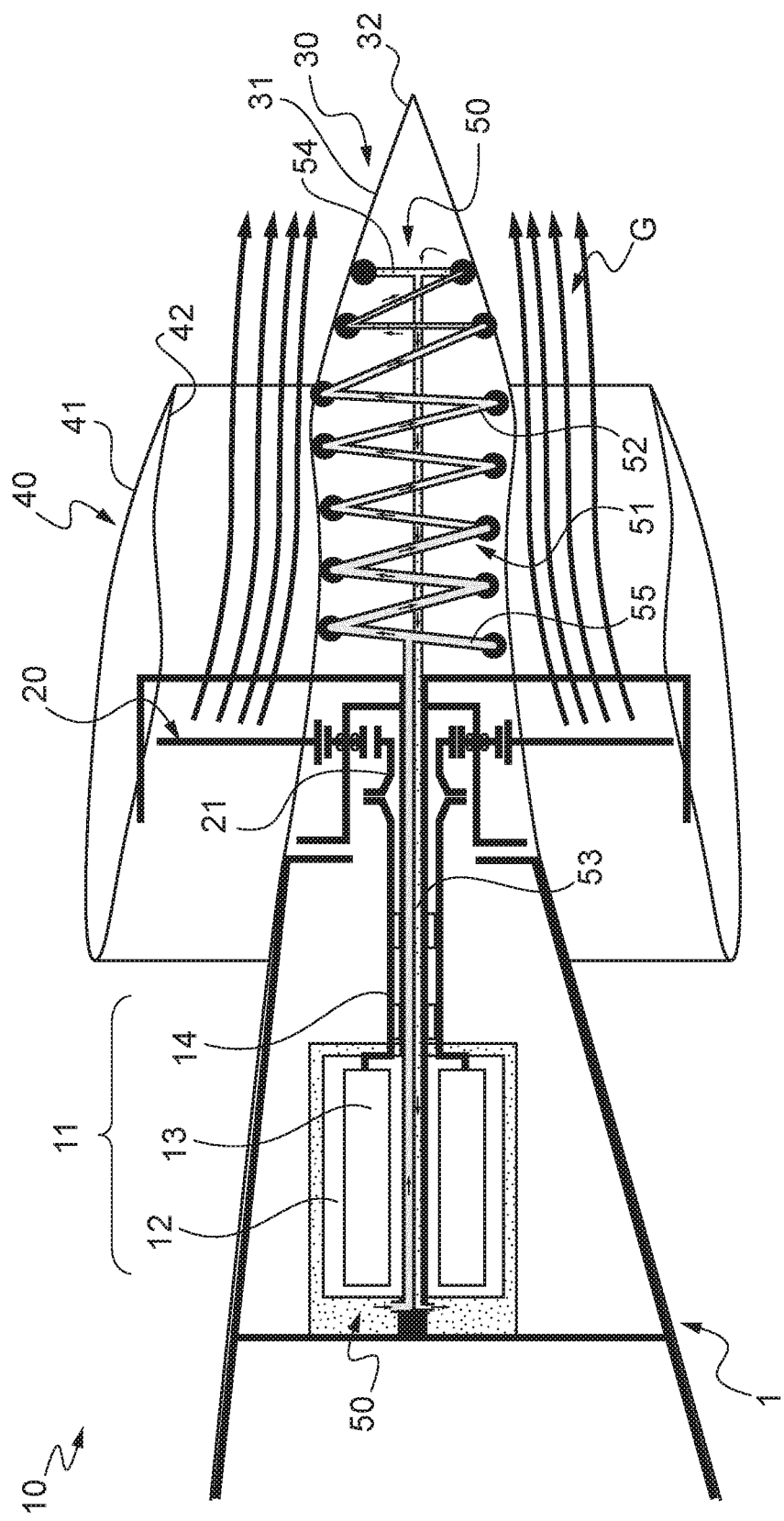
FIG. 2 is a schematic view of an example embodiment of a cooling system of an engine assembly according to the invention.

An aircraft typically has at least one fuselage, a rear portion 1 of which is shown here in FIG. 1, one airfoil (not shown) usually comprising two wings extending on both sides of the fuselage, and a tail unit.

Such an aircraft also has at least one engine assembly 10, which is in this case arranged inside the rear portion of the aircraft.

In this case, the engine assembly 10 includes an electric motor 11.

In this case, the electric motor 11 includes a stator 12 and a rotor 13, as well as an output shaft 14 that drives a fan 20 in rotation.

In this case, the stator 12, the rotor 13 and a portion of the output shaft 14 are positioned in the rear portion 1 of the fuselage.

In the present example embodiment, the stator 12 is fastened inside the rear portion 1 of the fuselage.

By definition, the fan 20 is positioned downstream of the electric motor 11.

The fan 20 has a drive shaft 21 that is linked to the output shaft 14 of the electric motor 11.

Downstream of the fan 20, the engine assembly has an exhaust cone 30.

The exhaust cone 30 principally comprises a wall 31.

In this case, the wall 31 has an aerodynamic shape.

The exhaust cone 30 in particular has a pointed extremity 32 referred to as the "plug" 32.

The engine assembly 10 also has a nacelle 40.

The nacelle 40 of the engine assembly is linked to the rear portion 1 of the fuselage.

The nacelle 40 has an outer aerodynamic fairing 41 and an inner aerodynamic fairing 42.

The inner aerodynamic fairing 42 and the wall 31 of the exhaust cone 30 together define a space that forms a conduit for the propulsion gases G of the aircraft generated by the fan 20, i.e. a thrust flow. The section of the conduit is for example variable.

In other words, the fan 20 is installed in the conduit of the nacelle 40.

Finally, the engine assembly 10 has a cooling system 50.

The cooling system 50 is mainly a channel 51.

The channel 51 for example forms a closed circuit.

In this case and by definition, the channel 51 is made up of two portions: a heat sink portion 52 and a heat recovery portion 53.

The heat sink portion 52 is arranged in the exhaust cone 30 downstream of the fan 20 and is designed to effect thermal exchanges with the wall 31 of the exhaust cone 30 to release heat and thereby cool a coolant fluid flowing through the channel 51.

Indeed, when the engine assembly 10 is in operation, the gas flows G generated by the fan 20, which flow over the wall 31 of the exhaust cone 30, enable the exhaust cone 30 to be cooled considerably. This phenomenon is even more pronounced in flight, when the ambient air is at a temperature of around −55° C., typically between −40° C. and −65° C.

Thus, the present invention enables this situation to be profitably exploited.

According to a specific example embodiment, the heat sink portion 52 of the channel 51 is arranged against the wall 31 of the exhaust cone 30. This helps to maximize the thermal exchanges between the cooling circuit 50 and the exhaust cone 30.

In the example shown schematically here, the heat sink portion 52 is arranged in helical spirals inside the exhaust cone 30.

The heat recovery portion 53 is designed to cool at least a portion of the engine assembly 10.

In the present example embodiment, the heat recovery portion 53 is a portion of the channel 51 that conveys the cooled fluid from the cooling cone; and in particular in this case from the last of the spirals 54 of the heat sink portion 52, which is arranged towards the plug 32; and which passes through the engine assembly to cool the different components thereof, as far as the first of the spirals 55 of the heat sink portion 52, which is located towards the fan 20.

Consequently, the first of the spirals 55 forms a coolant fluid inlet loop 55 in the heat sink portion 52, and the last of the spirals 54 forms a coolant fluid outlet loop 54 away from the heat sink portion 52.

In this case, the coolant fluid enters the heat recovery portion 53 after leaving the heat sink portion 52, and the coolant fluid leaves the heat recovery portion 53 after entering the heat sink portion 52.

In this case, the heat recovery portion 53 passes lengthwise through the drive shaft 21 of the fan 20 and the output shaft 14 of the engine, and is also arranged to cool the stator 12 and/or the rotor 13 of the engine 11.

Thus, the channel 51 is designed to convey a coolant fluid from the exhaust cone 30 to the electric motor 11, then back to the exhaust cone 30.

The invention thus developed proposes an arrangement for an aircraft engine assembly 10 with boundary layer ingestion that is designed to be installed in the rear portion 1 of an aircraft fuselage.

This arrangement enables profitable use to be made of the cold exchange surface formed by the wall 31 of the exhaust cone 30 while limiting or even obviating negative effects on drag.

Furthermore, such an arrangement provides a weight reduction and a cooling system 50 that is relatively more compact than in heat engine arrangements in the prior art.

The performance of the engine assembly is thus improved.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
    an electric motor comprising an output shaft;
    a fan configured to be driven in rotation by the electric motor and downstream of the electric motor, the fan comprising a drive shaft, the drive shaft configured to be driven by the output shaft;
    an exhaust cone downstream of the fan;
    a nacelle surrounding at least the fan and a portion of the exhaust cone that forms, with the nacelle, an air flow conduit of the engine assembly; and
    a cooling system having at least one channel, the channel having a heat sink portion arranged in the exhaust cone downstream of the fan and configured to effect thermal exchanges with a wall of the exhaust cone,
    wherein the at least one channel further comprises a heat recovery portion configured to cool at least the electric motor and/or the drive shaft of the fan, and
    wherein the heat recovery portion extends through the output shaft of the electric motor and the drive shaft of the fan.

2. The engine assembly according to claim 1, wherein the heat sink portion of the at least one channel is arranged against the wall of the exhaust cone.

3. The engine assembly according to claim 1, wherein the at least one channel forms a closed circuit.

4. The engine assembly according to claim 1, wherein the at least one channel is configured to convey a coolant fluid from the exhaust cone to the electric motor, then back to the exhaust cone.

5. The engine assembly according to claim 1, wherein the heat sink portion of the at least one channel is arranged in loops inside the exhaust cone.

6. The engine assembly according to claim 5, wherein the heat sink portion of the at least one channel has a coolant fluid inlet loop positioned towards the fan and a coolant fluid outlet loop positioned towards an extremity of the exhaust cone opposite the fan.

7. The engine assembly according to claim 6,
    wherein the heat recovery portion is configured to convey the coolant fluid from the coolant fluid outlet loop of the heat sink portion to the coolant fluid inlet loop of the heat sink portion.

8. A rear portion of an aircraft comprising a rear fuselage portion and at least one aircraft engine assembly according to claim 1, wherein at least one portion of the electric motor is positioned in the rear fuselage portion.

9. An aircraft including a rear portion according to claim 8.

* * * * *